Dec. 30, 1947.  L. H. COLLINS ET AL  2,433,739
VIBRATOR
Filed April 23, 1943  2 Sheets-Sheet 1
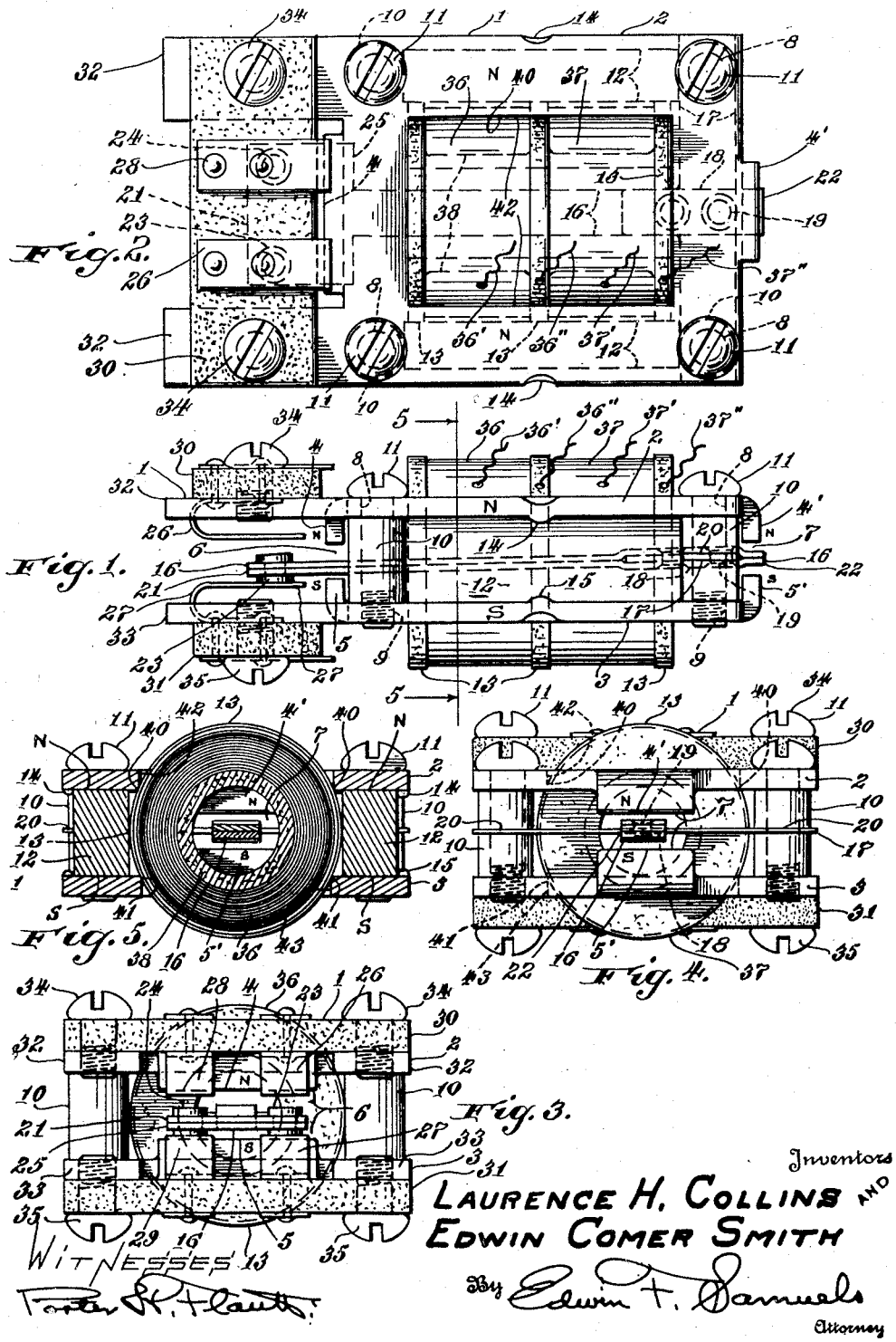
Inventors
LAURENCE H. COLLINS AND
EDWIN COMER SMITH Dec. 30, 1947.   L. H. COLLINS ET AL   2,433,739
VIBRATOR
Filed April 23, 1943   2 Sheets-Sheet 2

Inventor
LAURENCE H. COLLINS AND
EDWIN COMER SMITH

Patented Dec. 30, 1947

2,433,739

UNITED STATES PATENT OFFICE 2,433,739

VIBRATOR

Laurence H. Collins and Edwin Comer Smith, Baltimore, Md.

Application April 23, 1943, Serial No. 484,318

7 Claims. (Cl. 172—126)

The present invention relates to improvements in vibrators and is identified with a new and novel type of polarized vibrator and also a polarized synchronous vibrator and oscillating relay circuits therefor, whereby high voltage direct current for the plate power supply of vacuum tubes is provided from a low voltage direct current source.

Certain vibrators of this class perform the function of interrupting a circuit fed from a low voltage direct current source such as a primary or dry battery, or a secondary or storage battery, for purposes of causing the steady direct current supplied by the current source to fluctuate or pulsate, whereby a comparatively higher voltage can be obtained through the use of a transformer. The higher voltage fluctuating or alternating current from the transformer output is then rectified by the use of vacuum tube rectifiers or contact rectifiers for purposes of changing the said alternating current to high voltage direct current. Vibrators of this type are known as non-synchronous vibrators. On the other hand vibrators that perform the dual function of interrupting the current in the transformer primary circuit and rectifying the current in the transformer secondary circuit are known as synchronous vibrators. A familiar use and application of both forms of these vibrators is usually found in "B" power units for automobile and other portable radio and sound reproducing systems. These units usually operate from a 6-volt direct current supply, whereby a high voltage of direct current is provided for the plate power of the vacuum tubes. In view of structural limitations vibrators of this general type are quite inefficient and a material amount of power is consumed during operation thereof.

The present invention provides a new type of vibrator for this service, and herein referred to as a polarized vibrator or polarized synchronous vibrator in view of the provision of a constant or steady magnetic field, which may be provided by one or more permanent magnets or one or more electrically energized magnets. Our improved vibrator is also provided with means to produce a fluctuating or pulsating magnetic field which will be caused to cooperate with the first mentioned steady magnetic field, comprising armature driving coils, which are alternately electrically energized from a source of direct current.

Utilizing this and other novel principles of construction, operation and design to be hereinafter described, the present polarized vibrator will operate efficiently from a very low voltage source either as a non-synchronous or synchronous type vibrator.

By actual reduction to practice these improved vibrators operate in a practical and efficient manner from 1½ and 2 volt cells, or batteries. This very low voltage requirement of our improved vibrator renders it highly valuable for certain services for which conventional vibrators of today are unsuitable, such as wearable vacuum tube hearing aids, portable transceivers (walkie talkies) and other portable communication equipment usually requiring small "B" batteries to supply the plate power for their vacuum tubes.

An important object of the present invention is to provide a vibrator of this class having means to produce a steady magnetic field between spaced apart field plates, whereby a steady magnetic field is set up in the field plates and means to produce a fluctuating magnetic field between the same plates and to also be positioned between the plates whereby a very compact type of structure in this respect may be provided.

A further object of the invention is to provide means whereby the steady and fluctuating magnetic fields co-operate as to their respective polarities to provide magnetic forces to cause the armature of the vibrator to be actuated in opposite directions of movement.

Another object is to provide a novel vibrator having a vibrating armature provided with an end portion adapted to vibrate between oppositely polarized pole pieces, together with circuit connections controlled by the vibrating armature, the construction being such that the armature is polarized periodically in a reversed sense so that the combined repelling and attracting effects exerted by the pole pieces upon the armature are utilized to positively vibrate the latter.

A further important object of the present invention is to provide means whereby the steady and fluctuating magnetic fields together with the manner of supporting the vibrator armature, will cooperate to actuate or vibrate the armature by alternately introducing and utilizing at both ends of the armature in a simultaneous manner, poles of similar polarity in one instance and poles of opposite polarity in another instance, whereby one end of the armature is caused to be moved in one direction by both the repelling and attractive forces of polarity operating simultaneously on the said one end of the armature and similar forces operating in reversed directions at the other end of the armature and at the same time as the first named forces, to move the other end of the armature in an opposite direction, thereby introducing armature actuating impulses of both a repelling and attractive nature at each end of the armature in a simultaneous manner.

Another important object of the present invention is to provide a vibrator of this class having new and improved features of balanced magnetic driving forces, construction of parts and relative positions of the actuating and actuated elements whereby a greater efficiency in operation is reflected in low power consumption and operation from a very low voltage.

With these and other objects in view, the invention consists of certain other new and novel features of construction and combination of parts as will be specifically described in the following specification and claims.

In the accompanying drawings we have illustrated several forms of polarized vibrators embodying the various features of our invention in their preferred forms.

In the drawings:

Figure 1 is a side elevation of our improved vibrator, illustrating various structural details including fixed and fluctuating magnetic fields, and opposed contact features, whereby the vibrator may be readily adaptable for use either as a synchronous or non-synchronous type of vibrator, the same being shown on an enlarged scale of twice actual size for illustrative purposes.

Figure 2 is a top plan view on a similar enlarged scale, of the vibrator, clearly illustrating the top or upper fixed magnetic field plate structure and the manner of positioning the fluctuating magnetic field coils in the upper plate structure.

Figure 3 is a front end elevation on a similar enlarged scale, illustrating the opposed armature contacts in relation to the free end of the armature and the structural details of the vibrator identified therewith.

Figure 4 is an elevation, on an enlarged scale, of the rear end of the vibrator, clearly disclosing the upper and lower fixed magnetic field plates and their inwardly directed polarized extensions in relation to the vibrator armature member and the support.

Figure 5 is a sectional elevation, taken on the line 5—5 of Figure 1, on an enlarged scale, illustrating particularly the manner of supporting the fluctuating magnetic field coils between the upper and lower field plates, and fixing their positions in relation to and about the vibrator armature member.

Figure 6:
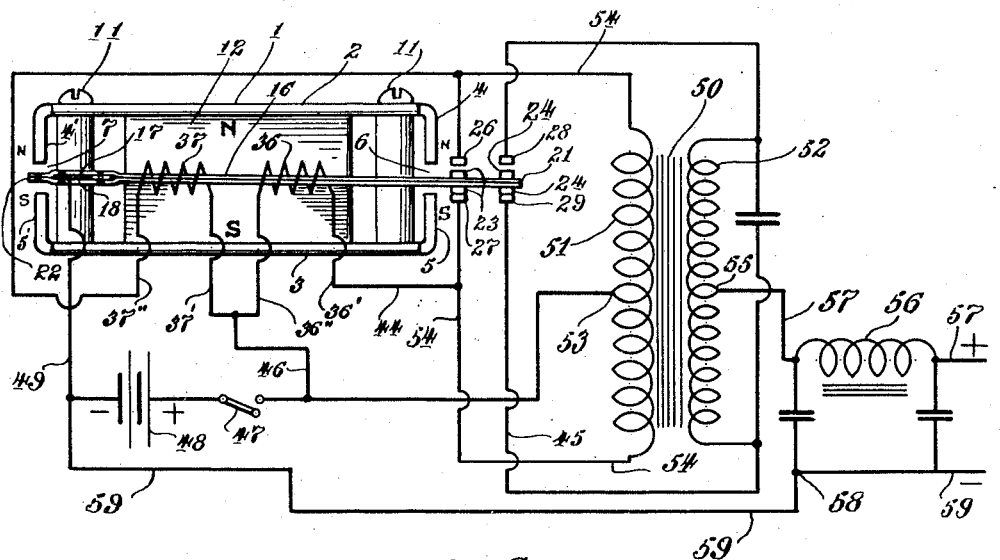
Figure 6 is a diagrammatic view of our preferred form of polarized vibrator and oscillating circuit, embodying the various features of the invention.

Referring to the drawings by reference numerals, each of which represents the same or similar parts throughout the various figures in the drawings and with particular reference to Figs. 1 to 5, the present invention of polarized vibrator comprises a vibrator 1, having upper and lower polarized or fixed magnetic field plates 2 and 3 respectively, each having a pair of inwardly directed polarized or magnetic extensions 4, 4', 5 and 5', respectively, and positioned whereby the extensions of one plate are substantially in alignment with the like extensions of the opposite plate, and stopping short of contacting each other, whereby air gaps 6 and 7 respectively are formed between the aligned extensions. These air gaps comprise opposite magnetic field forces, established by the respective extension members. In this respect it should be understood that the polarization of each of the respective extensions is fixed, thereby providing the fixed fields of polarity in the air gaps 6 and 7. For illustrative purposes the upper and lower polarized plates and their respective extensions have been identified as N and S poles respectively.

In regard to the terms applied to the various elements of the invention and their relative positions it is understood that no limitation of the features of the invention is intended in this respect.

For purposes of utilizing the field plates 2 and 3 as a supporting frame or cage for the different elements of the vibrator and also for providing means whereby the plates and their respective polarized extensions will be held in fixed spaced relation to each other as shown, the upper plate 2 is provided with screw holes 8, while the lower field plate 3 is provided with threaded holes 9, field plate spacing collars 10 surrounding plate screws 11 which are positioned in the holes 8 and holes 9.

To provide means for fixed polarization of the field plates 2 and 3 and their extensions whereby these plates and their extensions 4, 4', 5 and 5' may have fixed magnetic poles, the vibrator as shown in the preferred form is provided with a pair of permanent magnets 12, having their respective N and S magnetic poles positioned in juxtaposition to the upper and lower field plates 2 and 3 respectively.

One or more of these permanent magnets may be used to provide a steady or fixed magnetic field for the vibrator as described above, or if desired one or more electrically energized magnets may be used to advantage. However in the present instance a pair of permanent magnets as shown are preferred. These magnets may be fixedly positioned between the plates against either lateral or transverse movement by pressure being exerted or applied on their respective upper and lower faces by the combined clamping action thereon of the field plates and their screws 11, together with the abutment of their longitudinal ends against the spacing collars 10, and their inner and outer side walls being respectively impinged against the periphery of the coil flanges 13, as shown in Figs. 2 and 5, and the outer offset or peened portions 14 and 15 of the upper and lower field plates as shown.

A laminated type of vibrating armature 16 is used and positioned between the plates 2 and 3 by means of a relatively thin and yielding supporting metal strip 17 therefor, which is fixedly engaged to the armature 16 near one end thereof as shown at 18 as by rivets 19. The two opposite outside or transverse ends of the armature supporting member 17 are provided with openings through which the two field plate screws 11 at the back end of the vibrator are passed. In this respect it will be noted the spacing collars 10 at this end of the vibrator are split or separated at 20 forming two shorter collars, providing means whereby the said outside ends of the yielding support for the armature are positioned between the two smaller spacing collars for purposes of securely fastening these ends as shown.

It will be noted that both the forward or free end 21 and the rear or back end 22 of the armature 16 are positioned respectively in the air gaps 6 and 7 formed between the upper and lower polarized plate extension portions 4, 4', 5, and 5', and the yielding support 17 for the armature 16 is positioned somewhat forward of the rear end 22 of the armature and the polarized extensions 4' and 5', the purpose of which is to provide means whereby the armature will be driven at both ends by magnetic forces of attraction and repulsion.

The rivets 19 at the rear end of the armature may serve the dual purpose of holding the laminated portions of the armature together at the rear end 22, as well as attaching this end of the armature to its yielding supporting element. The contact points 23 and 24 at the front end 21 of the armature may also serve the dual purpose of functioning as contact points and also as rivets for holding the laminated portions of the armature together at the front end 21. In this respect it may be also noted that the front end is widened to form a head structure 25 for purposes of providing sufficient area to accommodate the contact points 23 and 24 as well as increasing the armature surface immediately adjacent the front polarized plate extensions 4 and 5.

A pair of yielding primary upper and lower opposed contacts 26 and 27 may be provided as shown, and positioned in the path of movement of the armature during normal vibration whereby the contact points 23 carried by the free end 21 of the armature will alternately engage the respective opposed primary contacts 26 and 27 for purposes to be hereinafter described. Also in this respect a pair of yielding secondary upper and lower opposed contacts 28 and 29 may be provided as shown, positioned in the path of movement of the armature during normal vibration periods, whereby contact points 24 carried by the free end of the armature will alternately engage the respective opposed secondary contacts 28 and 29. These primary and secondary contacts may be supported on the upper and lower cross members or bars 30 and 31 respectively which may be made of any desirable and suitable insulating material such as Bakelite or the like, for purposes of insulating the contacts against being grounded with the supporting field plate members 2 and 3. The contact supporting bars or members 30 and 31 may be securely fastened to the upper and lower field plate arms 32 and 33 respectively by screws 34 and 35.

The opposed contacts 26, 27, 28 and 29 are shown in the form of yielding spring members or arms, see in Figs. 1 and 3, and provide means whereby the respective normal operational engagement of these contacts or arms with the armature contacts, enable the opposed contacts to somewhat follow up the respective movement of the armature for purposes of maintaining contact therewith for a slightly extended period of time, thereby keeping one or the other of the respective field coils energized until the armature is within the zones or fields of the attracting magnetic forces of the polarized extensions towards which the respective ends of the armature are moving.

For purposes of providing our polarized vibrator with driving field coils for the armature and to produce fluctuating magnetic fields at the respective ends of the armature positioned between the respective field plate extensions having fixed fields of polarity, a pair of electrically excited or energized magnetic field coils 36 and 37 are provided, having leads or terminal wires 36', 36'', 37' and 37'', and mounted on an insulated spool type supporting member 38, comprising coil retaining and separating flanges 13. The coils and their supporting spool member are fixedly positioned between the polarized field plates and about the armature 16 in a novel and efficient manner against relative movement in all directions. In this respect the field plates 2 and 3 are provided with coil and spool positioning openings 42 and 43 respectively, in which the upper and lower portions of the coil and spool structure is partially passed, and in which the spool is snugly fitted and positioned against movement. Also the longitudinal edges 40 and 41 of the plate openings are held in clamped relation to the periphery of each of the spool flange members 13 as shown particularly in Fig. 5 of the drawing.

With particular reference to Fig. 6 of the drawing, the armature 16 and the respective armature contacts 23 and 24 are respectively shown in closed position or contact with the contact points 27 and 29 of the load and rectifying circuits 44 and 45 respectively.

The fluctuating magnetic field coils 36 and 37 are each connected through their outside terminal wires 36' and 37'' to the opposed primary contacts 27 and 26 respectively. The inner terminal or connector wires 36'' and 37' are each connected to a common return wire 46, which in turn is connected in series with the circuit control switch 47 and the positive terminal of a battery or low voltage source 48, which may be in the present instance 1½ volts, the negative side being either grounded or connected to the armature 16 as shown. The various other elements of the vibrator which may be grounded for convenience in construction. In this respect it may be noted that the field plates 2 and 3, their supporting and spacing elements and the yielding support for the armature are all grounded or connected to the negative side of the battery 48 through a return line 49.

For purposes of increasing the low output voltage of alternating current from the battery 48 and vibrator 1, a transformer 50 is provided, having primary and secondary coils 51 and 52 respectively, the primary coil being tapped at the center as shown at 53 and connected in series with the positive side of the battery 48 through the switch member 47, and being connected at its ends to the vibrator output circuit 54. For purposes of rectifying the high voltage alternating current delivered from the secondary winding 52, this secondary winding is connected to and shunted across the opposed secondary armature contacts 28 and 29, and also tapped at 55 and provided with a positive side output line 57 through the filter unit 56. The opposite or negative side 58 of the filter may either be grounded or connected to the negative side of the battery by the output negative wire 59 as shown.

Figure 7:
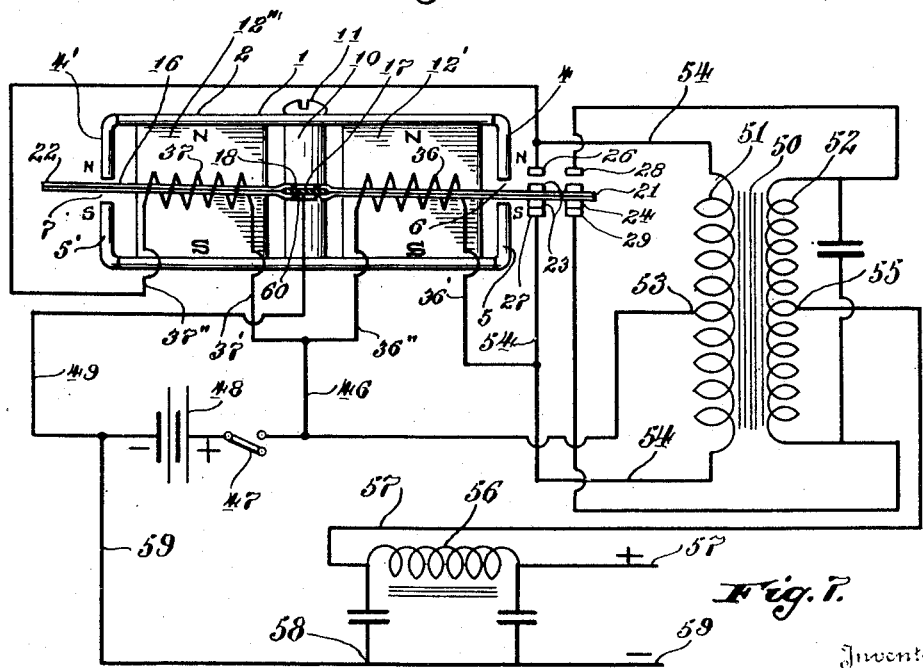
Figure 7 is a similar diagrammatic view of a modified form of the invention, wherein the vibrator armature is supported in a somewhat balanced position.

With reference to Fig. 7 in which a slightly modified form of our synchronous polarized vibrator is shown, the armature 16 is yieldingly supported substantially at the center of its over all length as indicated at 60, and in a manner similar to that shown in the preferred form of construction, for purposes of producing a balanced effect to the armature and its normal vibrational movements, thereby increasing the torsional drive of the vibrator armature 16.

Thus when introducing and applying the magnetic driving and actuating forces to each of the respective ends of the armature as indicated at 21 and 22, a minimum amount of power is necessary to normally actuate the vibrator armature. For convenience, in view of the plate screw 11 and collar 10, together with the support 17 being positioned in the center of the vibrator structure, permanent magnets 12' and 12" may be used to advantage and positioned on each side of the said armature supporting elements as shown. In all other respects as to mechanical structure or general features of construction this modified form of vibrator is similar to the preferred form of vibrator disclosed herein.

The operation of the invention as to both forms of vibrators is as follows: the fluctuating magnetic field coils 36 and 37 and the polarized field plates 2 and 3 and their respective polarized extensions 4, 4', 5, 5' are so poled that when the switch 47 is closed the direction of current through one or the other of the respective fluctuating field coils polarizes the armature ends 21 and 22 in such a manner with respect to the polarity of the fixed magnetic fields of the respective plate extensions as to cause the polarized armature ends to move towards the oppositely polarized plate extensions and away from the similarly polarized extensions to which they were originally in juxtaposiiton. The present invention thereby utilizes the scientific principle as to the reactions of magnetic forces wherein like forces repel and opposite forces attract, the armature 16 being thus caused to vibrate at a relatively high speed. The foregoing is a description of the operation of the vibrator when it is not connected to any external load.

In view of the use in this instance of the transformer 50, and the respective circuits both for increasing the voltage of alternating current from the vibrator output and rectification of the alternating current of higher voltage from the transformer output, whereby the present vibrator is used as a synchronous type of vibrator, being somewhat well known in this art, no specific detailed description is deemed necessary as to these elements other than a general reference to their functions as follows:

The alternating voltage set up in the secondary winding of the transformer as contact is alternately made by the armature 16 through its contact points 23 with the opposed contacts 26 and 27 of the vibrator input circuit is rectified by mechanically synchronizing opposed contacts 26 with 28 and 27 with 29, and in view of the armature being either grounded with the negative side of the battery or connected in circuit therewith by return wire 49 as shown, providing means to always ground that end of the secondary winding 52 which is at negative potential. This provides means whereby the center tap 55 of the secondary winding of the transformer may be maintained at a positive potential with respect to the negative return to the battery or ground, thereby rectifying the high voltage alternating current and producing an output of direct current of relative high voltage from a synchronous polarized vibrator as disclosed particularly in Figs. 6 and 7 of the drawings.

In operation, and with both of the forms of vibrator associated with the center-tapped primary 51 of the transformer 50, as shown, closing of the switch 47 will energize coil 36 from the battery 48, through connections 46, 36", 44, closed contacts 27 and 23, armature 16 and connection 49. Thus the coil 36 will cause the armature 16 to be polarized in one sense. At the same time, it will be noted that the lower half of the primary winding 51 will be energized from the battery 48, through connections 53, 54 and the closed contacts 27 and 23, and the primary winding 51, including lower and upper halves thereof will thus function as the secondary of an auto-transformer having a 2:1 step-up ratio. The induced voltage across the primary winding 51 will then be substantially twice that of the battery 48, and since this induced voltage is impressed across both coils 37 and 36 in series, it will be seen that coil 37 is so energized as to polarize the armature 16 in the same sense as that caused by the energization of the coil 36 as heretofore stated. The polarizing effect of the two coils 36 and 37 is thus additive under the aforementioned conditions.

It will be understood that energization of the coils 36 and 37 is such that the armature ends 21 and 22 are polarized in the same sense as the adjacent polarized field plate extensions 5 and 4' respectively, and oppositely to the respective extensions 4 and 5'. Thus the said armature ends will be repelled by the adjacent extensions 5 and 4' and attracted toward the remote extensions 4 and 5', such movement of the armature serving to open the formerly closed contacts 23 and 27 and closing the formerly open contacts 23 and 26. This action causes a reversal of the current flow through the coils 36 and 37 to thereby reverse the polarization of the respective ends 21 and 22 of the armature. This will be readily understood, since it will be seen that when contacts 23 and 26 are closed, the coil 37 and the upper half of the transformer primary winding 51, are then connected across the battery 48, while the induced voltage of the winding 51 functioning as the secondary of an auto-transformer, is again impressed across the coils 36 and 37, in reversed sense.

With reversal of polarization of the armature ends 21 and 22 it will be understood that such ends will be polarized in the same sense as the extensions 4 and 5' respectively and will be accordingly repelled by such extensions and attracted toward the respective extensions 5 and 4'. As soon as the formerly open contacts 23 and 27 are closed by the return movement of the armature, the above cycle will be repeated, thereby causing the armature to be positively driven at a relatively high frequency of vibration by the coaction of the magnetic field created by the polarization of the armature and magnetic field caused by the extensions 4, 5 and 5', 4'.

In view of providing the present vibrator with a steady polarized magnetic field, by means of the use of permanent magnets 12 or 12' and 12" and utilizing the well known principles of reactions as to opposed and similar magnetic forces, in practicing the present invention, very little power is required. Moreover, due to the novel principles of operation of the invention, it has been found that the vibrator will operate at a relatively high efficiency at lower voltages than have heretofore been practicable.

These features of the invention represent an important and new development in this art, wherein one or more permanent magnets or electrically energized magnets are used to establish a steady magnetic field in a vibrator for this service to produce a more sensitive and efficient vibrator.

In our polarized type of vibrator having a fixed or steady magnetic field produced by permanent magnets and an alternating or fluctuating magnetic field established by electrically energized coils wherein the vibrator serves the dual purpose of interrupting a primary circuit and rectifying a secondary circuit a novel and valuable contribution to the art has been made in this field, thereby providing for this service a synchronous polarized vibrator.

It is understood our new polarized vibrator using a steady or fixed magnetic field in conjunction with an alternating or pulsating magnetic field may be used to advantage as a non-synchronous type of vibrator wherein the vibrator is used principally for interrupting a primary circuit in this service.

Heretofore vibrators of this class used for this service have been of a non-polarized type wherein use is made only of a pulsating or alternating magnetic field produced by an electrically energized coil. This type of vibrator has proved to be inefficient and of insufficient sensitivity to operate on the low voltage that is sufficient for operation of our polarized vibrator. In view of this it may be readily seen our polarized vibrator provides less drain on the battery than the above referred to non-polarized vibrator, since the permanent magnets which establish the steady magnetic fields, do a large part of the work of actuating the vibrator armature. On the other hand, with the non-polarized vibrator all of the work is done by the battery through the electrically energized coils.

We have thus described our invention of a polarized vibrator particularly of the synchronous type and oscillating circuit therefor specifically and in detail in order that its nature, operation and construction may be fully understood. It will be understood however that the specific terms used herein are used descriptively rather than in a limiting sense, the scope of the invention being defined in the claims.

What we claim and desire to secure by Letters Patent is:

1. A polarized vibrator for converting low potential direct current to a pulsating current comprising a supporting frame including a pair of spaced-apart, parallel members, an armature, resilient means for lateral mounting said armature for vibration between said parallel members, a pair of oppositely polarized pole pieces supported by said members, and associated with the free end of said armature and between which said end is adapted to vibrate laterally, said end being normally drawn toward one of said pole pieces when idle, means including a stationary winding supported from said members and positioned around said armature for polarizing the latter from a direct current source in the same sense as the one pole piece toward which the said end is drawn when idle whereby said end is repelled by the last mentioned pole piece and attracted by the other pole piece, means including a second stationary winding supported from said members and positioned around the armature for polarizing the latter from the direct current source in the same sense as said other pole piece, whereby said end is repelled by said other pole piece and attracted by said one pole piece, a movable contact supported on each side of said armature, a pair of stationary contacts carried by said frame and respectively cooperating with said movable contacts, and circuit connections including said contacts and said armature and controlled solely by lateral vibration of the armature for selectively energizing said windings and oppositely polarizing said armature from the direct current source, in timed relation with the frequency of vibration of the armature.

2. A polarized vibrator comprising an armature mounted intermediate its ends for lateral vibration, a pair of oppositely polarized pole pieces associated with one end portion of said armature, a second pair of oppositely polarized pole pieces associated with the other end portion of the armature, said armature when idle having its opposite ends attracted by oppositely polarized pole pieces of said pairs, means including circuit connections controlled by one end portion of the armature for polarizing the latter from a direct current source in such manner that said end portions are oppositely polarized with respect to the adjacent pole pieces toward which said ends are attracted whereby said end portions are repelled from the adjacent pole pieces and attracted toward the remote pole pieces, and means including other circuit connections controlled by said one end portion for reversing the polarization of said armature as said end portions approach the remote pole pieces to cause said end portions to be repelled by the remote pole pieces and attracted back toward the adjacent pole pieces whereby said armature is laterally vibrated, said circuit connections including said armature and a pair of stationary contacts and a pair of movable contacts carried by the armature, the latter contacts being respectively engaged with the stationary contacts by lateral vibration of the armature.

3. A polarized vibrator for converting low potential direct current to pulsating current comprising a supporting frame including a pair of spaced-apart parallel members, an elongated armature resiliently mounted between said members so that an end portion thereof is capable of vibrating in opposite directions laterally of the armature, and means for causing lateral vibration of said armature at a substantially high frequency comprising unidirectional field-producing means associated with the vibrating end portion and including oppositely polarized pole members disposed on either side of said end portion, a stationary polarizing winding around said armature, supported by said frame and adapted to be connected with a direct current source, a pair of movable contacts carried by said armature, a stationary contact for each movable contact, said stationary contacts being supported from said frame, one of said movable contacts and one of said stationary contacts being normally closed by action of one of the pole members upon said end portion when said winding is de-energized, and means controlled solely by lateral vibration of the armature for periodically reversing the direction of flow of direct current through said polarizing winding to periodically reverse the polarization of said armature comprising circuit connections including the direct current source, the armature and said contacts whereby upon completion of said connections the armature is polarized in such manner as to be repelled by said one pole member and attracted by the other pole member, the resultant movement of the end portion breaking the contacts then in engagement and making the other contacts to reverse the polarization of the armature and to cause the armature to be repelled by the other pole member and attracted by the one pole member in order to secure sustained vibration of said armature at a substantially high frequency.

4. A polarized vibrator for converting low potential direct current to a pulsating current comprising a supporting frame including a pair of spaced-apart, parallel members, an elongated armature, means including a relatively thin and yieldable metal strip for supporting said armature adjacent one end so that the free end is capable of lateral vibration between said parallel members, and means for positively driving said armature in opposite directions to effect said lateral vibration comprising a permanent magnet means for producing a unidirectional field, and a means for producing an alternating magnetic field, the last named means including a stationary winding supported by said parallel members and arranged to be energized in opposite directions from a direct current source, one of said driving means including a pair of opposed pole pieces associated with the free end of said armature and in the field of which said end is adapted to vibrate laterally, and the other of said driving means being constructed and arranged to polarize said armature, the free end of the latter being normally attracted toward one or the other of said pole pieces when the armature is idle, a pair of movable contacts carried by said armature and positioned on opposite sides thereof, a pair of stationary contacts supported from said frame and positioned to be respectively engaged by the respective contacts of the first named pair by lateral vibration of the armature, one of said movable contacts and one of said stationary contacts being normally closed by the inter-action between said one or the other pole piece and the free end of the armature, and means comprising circuit connections including said armature and controlled by said contacts for periodically energizing said winding in opposite directions to alternately effect a simultaneous repelling and attracting action between said free end and said pole pieces during alternating making and breaking of contacts of said pairs to positively vibrate the armature at a substantially high frequency.

5. A polarized vibrator for converting low potential direct current to a pulsating current comprising a supporting frame including a pair of spaced-apart, parallel members, a current-conducting armature mounted at one end portion for lateral vibration between said members, means for constantly subjecting said armature adjacent its vibrating end to the action of a permanent magnetic field, means for polarizing said armature from a direct-current source, and means including circuit connections controlled solely by lateral vibration of the armature for periodically reversing the polarization of said armature to positively cause vibration of the latter, said circuit connections including said current-conducting armature and stationary contacts supported from the frame and positioned on opposite sides of the armature and between which said armature vibrates.

6. A polarized vibrator for converting low potential direct current to a pulsating current, comprising a supporting frame including a pair of spaced-apart, parallel members, a pair of pole pieces carried by said frame adjacent one end thereof, said pole pieces projecting toward each other in the space between said members and having their ends spaced-apart to provide an air gap, permanent magnet means carried by said frame for oppositely polarizing said pole pieces, an elongated armature positioned between said parallel members, means including a relatively thin and yieldable metal strip for supporting said armature from the frame for lateral vibration and with the vibrating end portion of the armature positioned to be influenced by the magnetic field emanating from said pole pieces, a pair of movable contacts supported by said armature and positioned on opposite sides thereof, a pair of stationary contacts carried by said frame and positioned to be respectively engaged by the respective movable contacts by lateral vibration of the armature, one of said movable contacts and one of said stationary contacts being normally closed by the magnetic action of one of the pole pieces upon the armature, and means to effect lateral vibration of said armature at a substantially high frequency comprising circuit connections controlled by said contacts and including said armature for periodically and oppositely polarizing the armature from a direct current source to alternately effect a simultaneous repelling and attracting action between said end portion and said pole pieces during alternating making and breaking of the contacts.

7. A vibrator as claimed in claim 6 which comprises in addition, resilient means for mounting the contacts of one of said pairs to secure a follow-up action during vibration of the armature to maintain said circuit connections during a portion of the movement of the said end portion in a direction to separate contacts then in engagement.

LAURENCE H. COLLINS.
EDWIN COMER SMITH.

REFERENCES CITED

The following references are of record in the file of this patent:

UNITED STATES PATENTS

| Number | Name | Date |
|---|---|---|
| 190,206 | Gary | May 1, 1877 |
| 1,944,487 | Bertschi | Jan. 23, 1934 |
| 843,287 | McCoy | Feb. 5, 1907 |
| 1,315,975 | Lincoln | Sept. 16, 1919 |
| 1,663,809 | Moon | Mar. 27, 1928 |
| 2,034,787 | Williams | Mar. 24, 1936 |
| 2,113,762 | James | Apr. 12, 1938 |
| 2,349,125 | Turner | May 16, 1938 |
| 2,245,511 | Turnbull | June 10, 1941 |
| 2,267,803 | Blount | Dec. 30, 1941 |
| 1,748,806 | Timmons | Feb. 25, 1930 |
| 2,143,097 | Warnke | Jan. 10, 1939 |
| Re. 18,971 | Rockwell | Oct. 24, 1933 |
| 2,235,316 | Dressel | Mar. 18, 1941 |
| 2,253,602 | Barrett | Aug. 26, 1941 |

FOREIGN PATENTS

| Number | Country | Date |
|---|---|---|
| 421,012 | Germany | Nov. 5, 1925 |